United States Patent
Evans et al.

(10) Patent No.: US 8,236,247 B2
(45) Date of Patent: Aug. 7, 2012

(54) MATERIAL WITHDRAWAL APPARATUS AND METHODS OF REGULATING MATERIAL INVENTORY IN ONE OR MORE UNITS

(75) Inventors: Martin Evans, Tolland, CT (US); Ronald Butterfield, Jackson, NJ (US)

(73) Assignee: Intercat Equipment, Inc., Manasquan, NJ (US)

( * ) Notice: Subject to any disclaimer, the term of this patent is extended or adjusted under 35 U.S.C. 154(b) by 216 days.

(21) Appl. No.: 12/645,862

(22) Filed: Dec. 23, 2009

(65) Prior Publication Data
US 2010/0154891 A1  Jun. 24, 2010

Related U.S. Application Data

(60) Provisional application No. 61/140,496, filed on Dec. 23, 2008.

(51) Int. Cl.
| F27B 15/08 | (2006.01) |
| G05D 7/00 | (2006.01) |
| G05D 16/00 | (2006.01) |
| B01J 19/00 | (2006.01) |
| B01J 8/18 | (2006.01) |
| B01J 8/00 | (2006.01) |
| B01J 8/02 | (2006.01) |
| B01J 35/02 | (2006.01) |
| B01J 19/24 | (2006.01) |
| F27B 15/00 | (2006.01) |
| F28F 27/00 | (2006.01) |

(52) U.S. Cl. ........ 422/145; 422/110; 422/111; 422/112; 422/113; 422/129; 422/139; 422/140; 422/144; 422/147; 422/187; 422/198; 422/211; 422/232; 165/96

(58) Field of Classification Search .................. 422/105, 422/110–113, 129, 139, 140, 144, 145, 147, 422/198, 211, 232, 187; 165/96
See application file for complete search history.

(56) References Cited

U.S. PATENT DOCUMENTS 2,616,591 A  11/1952 Haugen
(Continued)

FOREIGN PATENT DOCUMENTS

EP  0236609 A1  9/1987
(Continued)

OTHER PUBLICATIONS

PCT international search report and written opinion of PCT/US2009/069397, dated Aug. 19, 2010.
(Continued)

Primary Examiner — Walter D Griffin
Assistant Examiner — Natasha Young
(74) Attorney, Agent, or Firm — Kevin M. Carroll

(57) ABSTRACT

Material withdrawal apparatus, methods, and systems of regulating material inventory in one or more units are provided. A material withdrawal apparatus includes a heat exchanger and transport medium junction configured to provide transport medium to transport the withdrawn material from the unit to the heat exchanger. Another material withdrawal apparatus includes a heat exchanger and shock coolant junction configured to provide shock coolant to the material withdrawn from the unit. Another material withdrawal apparatus includes a heat exchanger, shock coolant junction, and transport medium junction. Another embodiment of a material withdrawal apparatus includes a vessel and shock coolant junction. Another material withdrawal apparatus includes a vessel and transport medium junction. The vessel includes a wall, liner with heat insulating refractory material, fill port, and a discharge port. Other embodiments provide methods of withdrawing or regulating material in a unit and systems coupled to a material withdrawal apparatus.

14 Claims, 6 Drawing Sheets

U.S. PATENT DOCUMENTS

| | | |
|---|---|---|
| 3,009,588 A | 11/1961 | Miitchell |
| 3,212,657 A | 10/1965 | Murfitt et al. |
| 3,850,582 A | 11/1974 | Luckenbach |
| 3,860,510 A | 1/1975 | Henke et al. |
| 3,893,905 A | 7/1975 | Fenske et al. |
| 4,005,908 A * | 2/1977 | Freeman .................. 406/25 |
| 4,082,513 A | 4/1978 | Andon et al. |
| 4,327,055 A | 4/1982 | Luckenbach et al. |
| 4,434,245 A | 2/1984 | Lomas et al. |
| 4,660,881 A | 4/1987 | Komeya et al. |
| 4,769,127 A | 9/1988 | Erickson et al. |
| 4,782,427 A | 11/1988 | Marks |
| 4,809,883 A | 3/1989 | Pozo |
| 4,809,889 A | 3/1989 | Friedman |
| 4,840,726 A | 6/1989 | Wakefield, Jr. |
| 4,888,156 A | 12/1989 | Johnson |
| 5,055,176 A | 10/1991 | Herbst et al. |
| 5,064,099 A | 11/1991 | Iwako |
| 5,190,635 A | 3/1993 | Hettinger |
| 5,286,370 A | 2/1994 | Chu et al. |
| 5,339,236 A | 8/1994 | Tamagawa |
| 5,350,609 A | 9/1994 | Bouchemousse |
| 5,389,236 A | 2/1995 | Bartholic et al. |
| 5,401,387 A | 3/1995 | Harandi et al. |
| 5,464,591 A | 11/1995 | Bartholic |
| 5,496,525 A | 3/1996 | Lietz et al. |
| 5,613,733 A * | 3/1997 | Miller et al. ............... 297/344.1 |
| 5,810,045 A | 9/1998 | Evans |
| 6,132,157 A | 10/2000 | Comardo |
| 6,358,401 B1 | 3/2002 | Evans |
| 6,859,759 B2 | 2/2005 | Evans |
| 6,878,656 B2 | 4/2005 | Bartholic |
| 6,974,559 B2 | 12/2005 | Evans |
| 7,050,944 B2 | 5/2006 | Evans |
| 7,223,714 B2 | 5/2007 | Beech, Jr. et al. |
| 7,364,708 B2 | 4/2008 | Evans |
| 7,390,396 B2 | 6/2008 | Evans |
| 7,431,894 B2 | 10/2008 | Evans |
| 7,438,863 B2 | 10/2008 | Evans |
| 7,510,647 B2 | 3/2009 | Evans |
| 7,622,600 B1 | 11/2009 | Marr |
| 7,842,250 B2 | 11/2010 | Evans |
| 2001/0041117 A1 | 11/2001 | Comardo |
| 2003/0127358 A1 | 7/2003 | Letzsch |
| 2004/0099572 A1 | 5/2004 | Evans |
| 2004/0102929 A1 | 5/2004 | Evans |
| 2004/0117158 A1 | 6/2004 | Evans |
| 2004/0166032 A1 | 8/2004 | Evans |
| 2005/0029163 A1 | 2/2005 | Letzsch |
| 2005/0103684 A1 | 5/2005 | Evans |
| 2005/0106079 A1 | 5/2005 | Evans |
| 2006/0074571 A1 | 4/2006 | Evans |
| 2006/0138028 A1 | 6/2006 | Evans |
| 2006/0147358 A1 | 7/2006 | Evans |
| 2006/0236595 A1 | 10/2006 | Nakamura |
| 2007/0020154 A1 | 1/2007 | Evans |
| 2007/0130822 A1 | 6/2007 | Araya |
| 2007/0204506 A1 | 9/2007 | Brenes |
| 2008/0029432 A1 | 2/2008 | Elliott et al. |
| 2009/0110608 A1 | 4/2009 | Vierheilig et al. |
| 2009/0115434 A1 | 5/2009 | Hirthe et al. |
| 2009/0115436 A1 | 5/2009 | Koehler, III et al. |
| 2009/0131711 A1 | 5/2009 | Wanasundara |
| 2009/0183422 A1 | 7/2009 | Wysong |
| 2009/0291469 A1 | 11/2009 | David |
| 2010/0189706 A1 | 7/2010 | Chang et al. |
| 2010/0230324 A1 | 9/2010 | Al-Alloush et al. |
| 2010/0317749 A1 | 12/2010 | Kukkonen et al. |
| 2010/0317905 A1 | 12/2010 | Kukkonen et al. |
| 2010/0319424 A1 | 12/2010 | Wietgrefe |

FOREIGN PATENT DOCUMENTS

| | | |
|---|---|---|
| JP | 63 294934 A | 12/1988 |
| JP | 2002-519302 T | 7/2002 |
| JP | 2008104355 A | 5/2008 |
| JP | 2008-180437 A | 8/2008 |
| KR | 2007-0100877 | 10/2007 |
| WO | WO-2008032094 A1 | 3/2008 |
| WO | WO-2009020459 A2 | 2/2009 |

OTHER PUBLICATIONS

"IMS to Control Room", Dwg S-29, Sheet 1, Intercat, Savannah, Georgia, Nov. 26, 2001.

Everlasting Valve Company, www.everlastingvalveco.com, printed Feb. 6, 2003.

ADPI C-Engine, www.adpi.com/C-Engine.htm, printed Nov. 15, 2002.

PCT Search report and written opinion of PCT US2009/055940 dated Jan. 31, 2011.

"IMS to Control Room", Dwg S-29, Sheet 1, Savannah, Georgia, Nov. 26, 2001.

PCT Search report and written opinion of PCT US2009/051958 dated Mar. 17, 2010.

European Search Report for PCT/US2006027542 dated Oct. 29, 2009.

PCT Search report and written opinion of PCT US2006/027542 dated Jan. 22, 2008.

PCT International Preliminary Report on Patentability for corresponding International Application No. PCT/US2009/069397 dated Jul. 7, 2011.

* cited by examiner

MATERIAL WITHDRAWAL APPARATUS AND METHODS OF REGULATING MATERIAL INVENTORY IN ONE OR MORE UNITS

CROSS-REFERENCE TO RELATED APPLICATIONS

This application claims priority to U.S. provisional patent application 61/140,496, filed Dec. 23, 2008, titled MATERIAL WITHDRAWAL APPARATUS AND METHODS OF REGULATING MATERIAL INVENTORY IN ONE OR MORE UNITS, which is incorporated by reference in its entirety.

This application is related to U.S. Pat. No. 7,431,894, issued Oct. 7, 2008, United States patent application publication number 2009-0196799A1 filed Feb. 4, 2009, and U.S. patent application Ser. No. 12/553,358 filed Sep. 3, 2009, all of which are incorporated by reference in their entireties.

BACKGROUND OF THE INVENTION

1. Field of the Invention

Embodiments of the invention generally relate to a material withdrawal apparatus and method of such. Particularly, the invention relates to material withdrawal apparatus and methods of metering and withdrawing one or more materials from one or more units, such as fluid catalytic cracking (FCC) units, and other units such as manufacture of acrylonitrile, as manufacture of pyridine and its derivatives, and other industrial processes, etc.

2. Description of the Related Art

FIG. 1 is a simplified schematic of a conventional fluid catalytic cracking system 130. The fluid catalytic cracking system 130 generally includes a fluid catalytic cracking (FCC) unit 110 coupled to a catalyst injection system 100, a petroleum feed stock source 104, an exhaust system 114 and a distillation system 116.

The FCC unit 110 includes a regenerator 150 and a reactor 152. The reactor 152 primarily houses the catalytic cracking reaction of the petroleum feed stock and delivers the cracked product in vapor form to the distillation system 116. Spent catalyst from the cracking reaction is transferred from the reactor 152 to the regenerator 150 to regenerate the catalyst by removing coke and other materials. The regenerated catalyst is reintroduced into the reactor 152 to continue the petroleum cracking process to burn off coke from the catalyst. The regenerated catalyst is then reintroduced into the reactor 152 to continue the petroleum cracking process.

The fluid catalytic cracking system 130 generally includes a FCC unit 110 coupled to a catalyst injection system 100 that maintains a continuous or semi-continuous addition of fresh catalyst to the inventory circulating between a regenerator 150 and a reactor 152.

During the catalytic process, a dynamic balance of the total catalyst within the FCC unit 110 is maintained. For example, catalyst is periodically added utilizing the catalyst injection system and some catalyst is lost in various ways such as through the distillation system, through the effluent exiting the regenerator 150, and deactivation of the catalyst, etc. If the amount of catalyst within the FCC unit 110 decreases over time, the performance and desired output of the FCC unit 110 will diminish, and the FCC unit 110 will become inoperable. Conversely, if the catalyst inventory in the FCC unit 110 increases over time, the catalyst bed level within the regenerator reaches an upper operating limit and the excess or deactivated catalyst may be withdrawn to prevent unacceptably high catalyst emissions into the flue gas stream, or other process upsets.

Thus, a need exists for a material withdrawal apparatus and method suitable for withdrawing materials from one or more units, like FCC units. Furthermore, a need also exists for a material withdrawal apparatus and method suitable for withdrawing materials from one or more units under a low oxygen environment condition, such as partial burn or partial combustion and poor air circulation.

BRIEF DESCRIPTION

The purpose and advantages of embodiments of the invention will be set forth and apparent from the description of exemplary embodiments that follows, as well as will be learned by practice of the embodiments of the invention. Additional advantages will be realized and attained by the methods and systems particularly pointed out in the written description and claims hereof, as well as from the appended drawings.

An embodiment of the invention provides a material withdrawal apparatus. The material withdrawal apparatus includes a heat exchanger and a least a member selected from the group consisting of transport medium junction and shock coolant junction. The heat exchanger includes a material inlet coupled to one or more units from which material is withdrawn. The transport medium junction is configured to provide transport medium to transport the withdrawn material from the one or more units to the heat exchanger. The shock coolant junction is configured to provide shock coolant to the material withdrawn from the one or more units.

A second embodiment of the invention provides a material withdrawal apparatus. The material withdrawal apparatus includes a vessel and at least a member selected from the group consisting of transport medium junction and shock coolant junction. The transport medium junction is configured to provide transport medium to transport the withdrawn material from one or more units to the vessel. The shock coolant junction is configured to provide shock coolant to material withdrawn from the one or more units unit. The vessel is suitable for high temperature operation and includes a wall, liner, fill port and a discharge port. The liner includes a heat insulating refractory material and the fill port is configured to receive withdrawn material from at least one unit.

A third embodiment provides a method. The method includes withdrawing material from one or more units; and conducting at least a member selected from the group consisting of shock cooling the withdrawn material with a shock coolant and transporting the withdrawn material with a transport medium from the one or more units to a heat exchanger coupled to the one or more units.

A fourth embodiment provides a method. The method includes withdrawing material from one or more units; and conducting at least a member selected from the group consisting of shock cooling the withdrawn material with a shock coolant and transporting the withdrawn material with a transport medium from the one or more units into a vessel coupled to the one or more units. The vessel includes a wall, liner, fill port and a discharge port. The liner comprises a heat insulating refractory material and the fill port is configured to receive withdrawn material from at least a unit.

A fifth embodiment provides a system. The system includes one or more units coupled to a material withdrawal apparatus. Material withdrawal apparatus includes at least a member selected from a group consisting of heat exchanger, a vessel, and combinations thereof; and at least a member selected from the group consisting of transport medium junction, shock coolant junction, and combinations thereof. The transport medium junction is configured to provide transport medium to transport the withdrawn material from one or more units to the vessel. The shock coolant junction is configured to provide shock coolant to material withdrawn from the one or more unit. The heat exchanger includes a material inlet, material outlet, cooling fluid inlet, and cooling fluid outlet. The material inlet is coupled to one or more units and the sensor is coupled to the heat exchanger to provide a metric indicative of the temperature at the material inlet; material outlet; cooling fluid inlet and cooling fluid outlet. The vessel includes a wall, liner, fill port and a discharge port. The liner comprises a heat insulating refractory material and the fill port is configured to receive withdrawn material from at least a unit.

DESCRIPTION OF THE DRAWINGS

The accompanying figures, which are incorporated in and constitute part of this specification, are included to illustrate and provide a further understanding of the method and system of the invention. Together with the description, the drawings serve to explain the principles of the invention.

Figure 1:
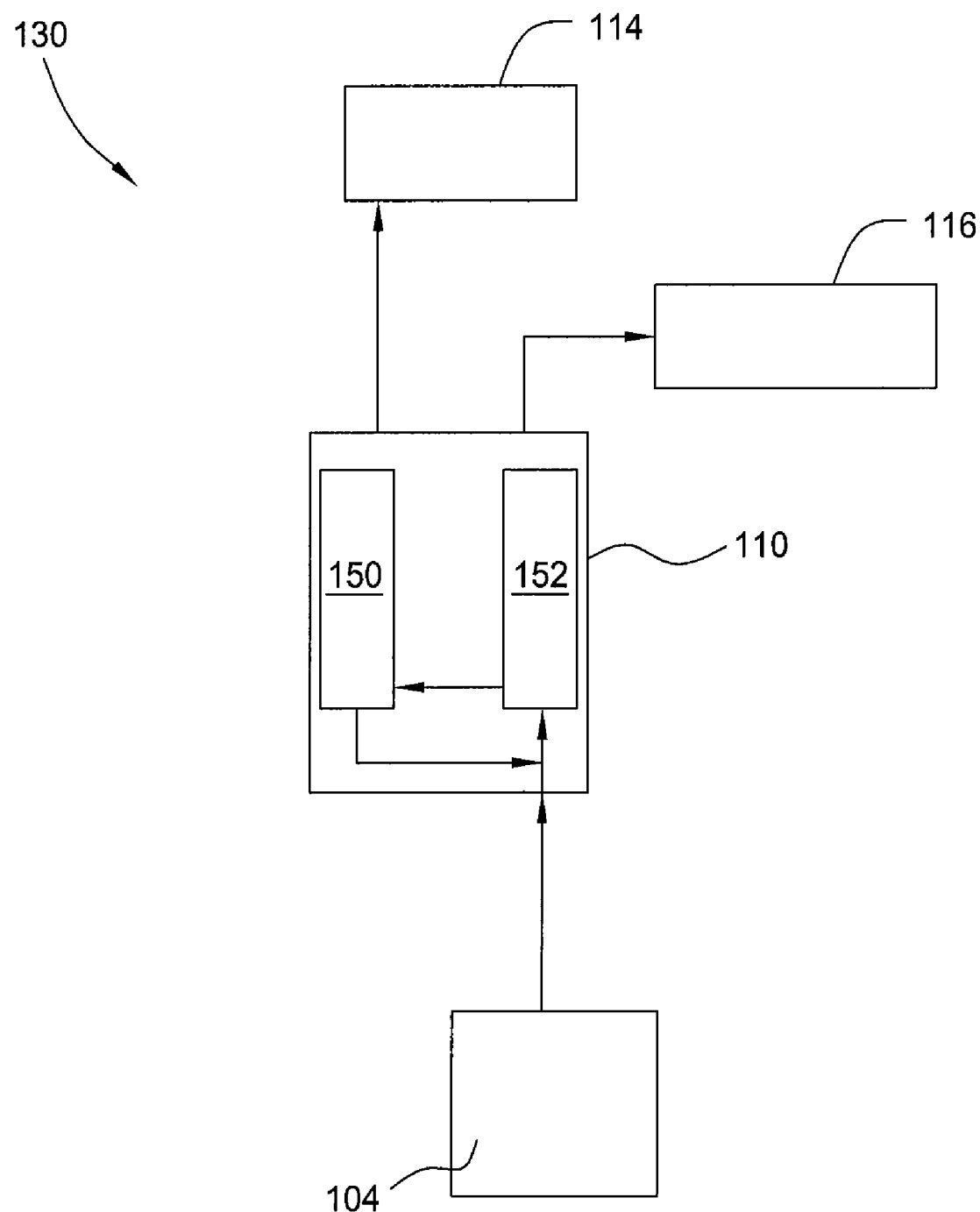
FIG. 1 is a schematic diagram of a conventional material withdrawal apparatus in accordance with an embodiment of the present invention.

To facilitate understanding, identical reference numerals have been used, where possible, to designate identical elements that are common to the figures, except that suffixes may be added, when appropriate, to differentiate such elements. The images in the drawings are simplified for illustrative purposes and are not depicted to scale. It is contemplated that features or steps of one embodiment may be beneficially incorporated in other embodiments without further recitation.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms. Reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free", "depleted" or "minimal" may be used in combination with a term, and may include an insubstantial number, or trace amounts, while still being considered free of the modified term. For example, free or depleted of oxygen, and like terms and phrases, may refer to an instance in which a significant portion, some, or all of the oxygen is not present.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable.

Reference will now be made in detail to exemplary embodiments of the invention which are illustrated in the accompanying figures and examples. Referring to the drawings in general, it will be understood that the illustrations are for describing a particular embodiment of the invention and are not intended to limit the invention thereto.

Whenever a particular embodiment of the invention is said to comprise or consist of at least one element of a group and combinations thereof, it is understood that the embodiment may comprise or consist of any of the elements of the group, either individually or in combination with any of the other elements of that group. Furthermore, when any variable occurs more than one time in any constituent or in formula, its definition on each occurrence is independent of its definition at every other occurrence. Also, combinations of substituents and/or variables are permissible only if such combinations result in stable compounds.

Figure 2:
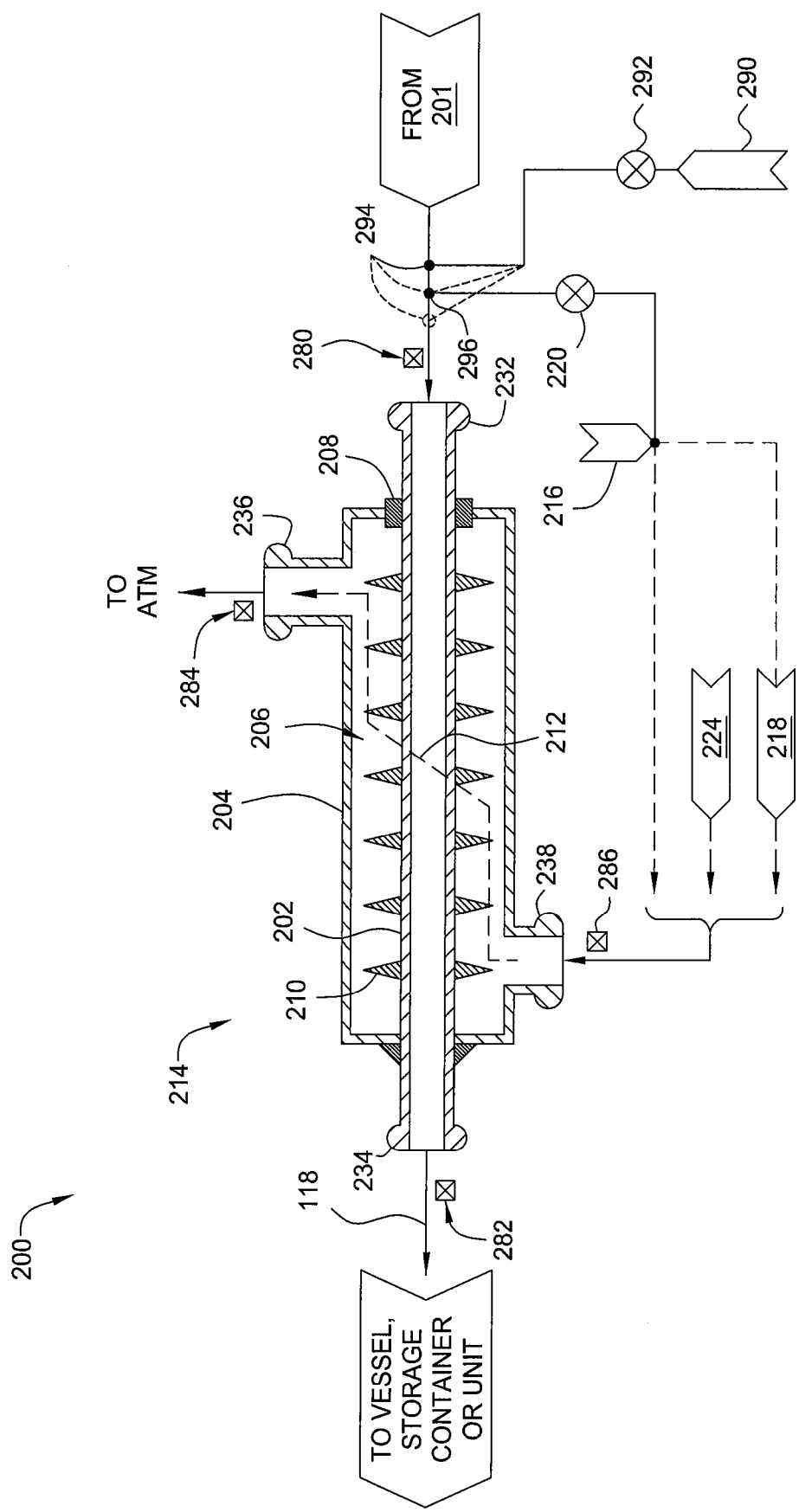
FIG. 2 is a schematic diagram of a material withdrawal apparatus having a transport medium junction and or shock coolant junction in accordance with an embodiment of the present invention.

FIG. 2 is a schematic representation of an embodiment of a material withdrawal apparatus 200 for removing one or more types of materials from one or more units 201. An embodiment of the material withdrawal apparatus 200 includes one or more heat exchangers 214 and one or more transport medium junctions 296. A transport medium junction 296 is configured to provide one or more transport mediums to transport the material from the one or more units to the one or more heat exchanger and the invention is not limited by the location of the transport medium junction or combination of junctions 296. In one embodiment, the provided transport medium has an oxygen content less than 20%. In another embodiment, the transport medium has an oxygen content less than 10%. In yet another embodiment, the transport medium has an oxygen content less than 5%. The Flammable Range (Explosive Range) is the range of a concentration of a gas or vapor that will burn (or explode) if an ignition source is introduced. In some embodiments, the transport medium is provided below the explosive or flammable range (as referred as "Lower Explosive or Flammable Limit" (LEL/LFL) such that the mixture is too lean to burn. In some other embodiments, the transport medium is provided above the upper explosive or flammable limit (as referred as "Upper Explosive or Flammable Limit" (UEL/UFL) such that the mixture is too rich to burn.

Non-limiting examples of transport medium include but are not limited to the following, either individually or a combination of two or more thereof: water, inert gas, transporting medium having an oxygen content less than the amount necessary to support combustion upon contact of transport medium with the withdrawn material, and reaction product of one or more materials combusted for a sufficient time to have an oxygen content less than the amount necessary to support combustion upon contact of transport medium, etc. Non-limiting examples of materials which may be combusted for a sufficient time to have an oxygen content less than the amount necessary to support combustion upon contact of transport medium with the withdrawn material include fuel gas, LPG, Hydrogen, natural gas, water gas, naphtha, gasoline, gas oil, coal, carbon, vacuum gas oil, and residual oil either individually or a combination of two or more thereof. In a particular embodiment, reaction product of material combusted in air comprises flue gas having a depleted oxygen content. It should be appreciated that the transport medium also includes the reaction product of the described embodiments with each other, either individually or a combination of two or more thereof, such as the reaction product of water, inert gas, transporting medium having an oxygen content less than the amount necessary to support combustion upon contact of transport medium with the withdrawn material, and the combusted material. The reaction product or products may be chemically or physically reacted, in part to whole.

Another embodiment of the material withdrawal apparatus 200 includes one or more heat exchanger 214 and one or more shock coolant junctions 294. The shock coolant junction 294 is configured to provide one or more shock coolant sources 290 to the withdrawn material from the at least one unit 201 and the valve 292 may regulate the flow or amount of shock coolant source 290.

Non-limiting examples of shock coolant include but are not limited to water, inert gas, liquid nitrogen, and transporting medium having an oxygen content less than the amount necessary to support combustion upon contact of transport medium with the withdrawn material, either individually or a combination of two or more thereof. It should be appreciated that non-limiting examples of shock coolant also include the reaction product of the described shock coolants, either individually or a combination of two or more thereof. The invention is not limited by the location of the one or more shock coolant junctions 294.

In one embodiment, shock coolant has a specific heat capacity from about to 1 KJ/Kg·K to about 5 KJ/Kg·K. In another embodiment, shock coolant has a specific heat capacity of at least about 1.5 KJ/Kg·K.

In one embodiment, shock coolant has a latent heat from about to 150 KJ/Kg to about 2500 KJ/Kg. In another embodiment, shock coolant has a latent heat of at least 1000 KJ/Kg. In yet another embodiment, shock coolant has a latent heat of at least 1500 KJ/Kg.

In an embodiment, sufficient shock coolant is provided in an amount sufficient to reduce the risk of combustion by lowering the temperature of the combined mixture of withdrawn catalyst and shock coolant. In another embodiment, sufficient shock coolant is provided in an amount sufficient to lower the temperature of the combined mixture of withdrawn catalyst and shock coolant to 427° C. In yet another embodiment, shock coolant is provided in an amount sufficient to lower the temperature of the combined mixture of withdrawn catalyst and shock coolant to below auto ignition temperature.

It should be appreciated that embodiments of the invention are not limited by the above named shock coolants and embodiments of the invention include providing one or more shock coolants based on one or more combination of characteristics such as specific heat capacity, latent heat, and supply temperature which is the temperature of the provided shock coolant. Further, it should be appreciated that embodiments of the invention include choosing a shock coolant based on characteristics such as the higher the specific heat capacity and or latent heat, the higher the range of supply temperature may be. Conversely, embodiments of the invention include choosing a shock coolant based on characteristics such as the lower the supply temperature, the lower the range of specific heat capacity and or latent heat may be.

In one embodiment, the one or more shock coolants has one or more combination of characteristics of sufficiently high specific heat capacity and or sufficiently high latent heat, and or sufficiently low supply temperature to cool the withdrawn material to a desired temperature range. Thus, embodiments of the invention include cooling the withdrawn material to a desired temperature range by providing a shock coolant based on characteristics such as sufficiently high specific heat capacity and or sufficiently high latent heat, and or sufficiently low supply temperature. Embodiments of the invention include further controlling the degree of cooling or decreasing the temperature of withdrawn material by providing a shock coolant with a higher specific heat, higher latent heat, and or lower supply temperature, either individually or in a combination thereof. Conversely, embodiments of the invention include further controlling the degree of increasing the temperature of withdrawn material by providing a shock coolant with a lower specific heat, lower latent heat, and higher supply temperature, either individually or in a combination thereof.

In one embodiment, one or more shock coolants has one or more combination of characteristics of sufficiently high specific heat capacity, sufficiently latent heat, and sufficiently low supply temperature to cool the withdrawn material to less than 538° C. In another embodiment, one or more shock coolants has one or more combination of characteristics of sufficiently high specific heat capacity, sufficiently latent heat, and sufficiently low supply temperature to cool the withdrawn material to less than 482° C. In yet another embodiment, one or more shock coolants has one or more combination of characteristics of sufficiently high specific heat capacity, sufficiently latent heat, and sufficiently low supply temperature to cool the withdrawn material to less than 427° C. In yet another embodiment, one or more shock coolants has one or more combination of characteristics of sufficiently high specific heat capacity, latent heat, and sufficiently low supply temperature to cool the withdrawn material to less than 204° C.

In one embodiment, one or more shock coolants has a specific heat capacity from about to 1 KJ/Kg·K to about 5 KJ/Kg·K and has latent heat from about to 150 KJ/Kg to about 2500 KJ/Kg. In another embodiment, one or more shock coolants has a specific heat capacity of at least 1.5 KJ/Kg·K and has a latent heat of at least about 1500 KJ/Kg.

Another embodiment of the material withdrawal apparatus includes one or more heat exchanger 214, one or more shock coolant junctions 294 and one or more transport medium junctions 296. The invention is not limited by the location of the shock coolant junction 294 or the transport medium junction 296, either individually or relative to each other. For example, it is within the scope of the invention to adjust the spacing of the shock coolant junction 294 or the transport medium junction 296 from an unit 201. For example, it is within the scope of the invention to place the shock coolant junction 294 downstream or upstream of the transport medium junction 296. In one embodiment, a shock coolant junction 294 is upstream of the transport medium junction 296. In another embodiment, a plurality of shock coolant junctions 294 may be respectively downstream and upstream of a transport medium junction 296.

Low Oxygen Environment

Embodiments of the invention include systems and methods for withdrawing material at various low oxygen environment conditions. Examples of low oxygen environment condition include, but are not limited to, partial burn partial combustion, mixed mode FCC, full combustion FCC with poor air circulation, etc. A non-limiting embodiment of approximate conditions of a low oxygen environment include CO level of the flue of the regenerator section consistently >0.5%, more particularly >1%. Another non-limiting embodiment of approximate conditions of a low oxygen environment include excess $O_2$ level from the exit of the regenerator section of the FCC unit to be <0.5%, more particularly about <0.2%. In another embodiment of approximate conditions of a low oxygen environment such as a full combustion FCC with poor air distribution, the exit of the regenerator section of the FCC unit has occasional excursions of CO that are >0.5% and the excess $O_2$ level from the exit of the regenerator section is typically >0.5%.

Partial Combustion FCC

An embodiment of the low oxygen environment condition includes a partial combustion FCC. When catalyst is withdrawn from a full burn FCC regenerator, the catalyst is almost fully regenerated and little or no coke remains on the catalyst. Thus, there is none or minimal additional combustion in the withdrawal line. In contrast, when catalyst is withdrawn from a partial burn FCC regenerator, the catalyst is usually not fully regenerated and some coke remains on the catalyst. Usually, enough coke remains to probably cause combustion in the withdrawal line when carrier or transport air is added, the combustion of which heats up the withdrawal line and negates efforts to cool the withdrawn catalyst.

In a non-limiting embodiment, one or more advantages of the invention may prevent or minimize such combustion from withdrawing partially regenerated catalyst with remaining coke deposits in partial burn FCC units by at least partially using transport medium such as inert gas or steam instead of air to minimize combustion. However, embodiments of the invention are not restricted to partial burn environment and also include systems and methods of at least partially using transport medium such as inert gas or steam instead of air to minimize combustion in other units.

A non-limiting example of a partial combustion FCC unit is characterized by possessing certain combinations of carbon monoxide, and excess oxygen in the flue gas. In one embodiment, a substantial amount of coke carbon is left on the catalyst particles when removed from the FCC regeneration zone and recycled to the FCC conversion zone. For example, the regeneration gas may contain free or molecular oxygen in an amount somewhat less than that required for complete combustion of coke (carbon and hydrogen) to carbon dioxide and steam. For illustration and not limitation, the oxygen-containing gas may be provided into the regeneration zone of the FCC system to react with less than substantially all the carbon in the coke on the catalyst particles in the regeneration zone, thereby burning off limited coke from the catalyst particles in the regeneration zone to leave an average remaining carbon content of greater than, such as but not limited to, 0.2 weight percent.

A non-limiting embodiment of approximate conditions of a partial combustion FCC are shown in table 1 below:

TABLE 1

| Parameter | Value in flue gas |
| --- | --- |
| Excess Oxygen | Less than about 0.5% or less than about 0.2% |
| CO, v % | Greater than about 1% or greater than about 0.5% |

In contrast to a partial combustion FCC unit, a non-limiting example of a full combustion FCC unit is characterized by possessing a reasonably high excess concentration of oxygen in the flue gas. Embodiments of the invention also include systems and methods of at least partially using transport medium such as inert gas or steam instead of air to minimize combustion in full combustion FCC unit. A full combustion FCC unit generally operates at higher temperatures than a similar FCC unit operating in partial combustion mode. In full combustion mode, the higher the excess $O_2$ levels of the unit, the lower will be the CO levels, since ample oxygen is present to convert this remnant CO to $CO_2$, or similarly, promote the conversion of the carbon directly to $CO_2$, without the formation of CO. Non-limiting example of approximate conditions of a full combustion FCC are shown in table 2 below:

TABLE 2

| Parameter | Value in flue gas |
| --- | --- |
| Excess Oxygen | Greater than about 0.5% |
| CO, v % | Less than about 1% |

Mixed Mode FCC

Mixed Mode FCC is designed to incorporate the elements of both a partial combustion and full combustion FCC. In a first section, a partial combustion section of the regenerator, conditions are kept such that the carbon residue on the catalyst is oxidized predominantly to CO, leaving essentially no excess $O_2$. In the second section, a full combustion section, the catalyst is further contacted with a relatively higher concentration of air in order to remove additional residual carbon from the catalyst surface. This two-mode process subjects the catalyst to less high temperature deactivation than a conventional full combustion FCC. Thus, an embodiment of the invention includes withdrawing material from a mixed mode FCC, with particular advantage in the partial combustion stage of the regenerator. An embodiment of a mixed mode FCC unit includes Stone & Webster Axxens R2R™ model which contains a dual stage regenerator. Another embodiment of a mixed mode FCC unit includes UOP RCC™ unit.

Full Combustion FCC with Poor Air Distribution

It has been observed that some units, although operating in full combustion mode, contain one or more conditions found in partial combustion units, most notably essentially no excess $O_2$ and very high CO levels. This type of condition may be observed by monitoring the flue gas of the unit for CO level. If the unit routinely shows excursions of CO above 1%, then this type of unit may have poor air distribution and would benefit from the embodiments described herein and is within the scope of the invention.

Air is continually introduced into the bottom of the regenerator, although one skilled in the art will appreciate that air can be introduced at any location in the regenerator. Air contains about 21% oxygen (i.e., $O_2$), about 78% nitrogen (i.e., $N_2$), and about 1% of other components. In some FCC units, the air and or coked catalyst may be unevenly distributed in the regenerator. Uneven distribution means that there are areas in the regenerator that have high oxygen concentrations (e.g., above 2% oxygen; above 3% oxygen; above 4% oxygen; or above 5% oxygen, i.e., an oxidizing environment) and areas that have low oxygen concentrations (e.g., less than 2% oxygen, i.e., a reducing environment). Thus, within the scope of and in one embodiment of the invention, the systems and methods include withdrawing material from an FCC unit that has regenerator with uneven oxygen distribution.

It should be understood that is within and included in the scope of the invention to adjust various FCC unit parameter settings. Examples of such parameters include temperature, pressure, and the residence time of the cracking catalyst in the regeneration zone. It should also be understood that the invention is not limited by the type of FCC feed, type of FCC catalyst, or FCC unit.

In one embodiment, the heat exchanger 214 includes one or more material inlets 232, one or more material outlets 234, one or more cooling fluid outlets 236, and one or more cooling fluid inlets to 238. A material inlet coupled to at least a unit 201. One or more sensors 280, 282, 284, and 286 are included.

In an embodiment, heat exchanger 214 includes a plurality of sensors such as one or more material inlet temperature sensors 280, one or more material outlet temperature sensors 282, one or more cooling fluid outlet temperature sensors 284, and one or more cooling fluid inlet temperature sensor 286 to respectively provide metrics indicative of the temperatures at the material inlet 232, material outlet 234, cooling fluid inlet 238, and cooling fluid outlet 236. Non-limiting examples of temperature sensors, for illustration and not limitation, include Thermocouples, Pt Resistance Thermometers, and IR cameras, either individually or in a combination of two or more thereof. Pt Resistance Thermometers measure temperature based on changes in electrical resistance of Platinum (Pt) at different temperatures. IR cameras use the measurement of infrared light emissions to measure the temperature of an object. In one embodiment, cooling fluid outlet to 236 and cooling fluid inlet 238 are respectively located in 2 opposite ends of the heat exchanger 214.

In one embodiment, a weight measuring vessel is bypassed and material withdrawal system 200 is substantially free of the vessel; the mass or quantity of withdrawn material from the unit is measured by a heat balance around the heat exchanger 214. In another embodiment, a withdrawn material flows from a unit 201 to the heat exchanger 214 and then delivery line 118 connect the heat exchanger 214 to a vessel. Thus, in one embodiment, a delivery line 118 delivers withdrawn cooled material from the heat exchanger to the vessel. It should be appreciated that the material withdrawal apparatus 200 may be used in units or processes which have varying degree of specificity in metering the amount of withdrawn material. Thus, depending upon the specificity of calculating the amount of withdrawn material, the mass or quantity of withdrawn material from the unit (i.e. the catalyst cooled and transferred to the spent catalyst hopper) may be calculated by a heat balance around the heat exchanger system by the use of the following equation, with or without a metering vessel:

Mass of air×Specific Heat of Air×(Air Temp outlet–Air Temp inlet)=(Mass of Catalyst, transport medium and shock coolant)×(Specific heat of Catalyst, transport medium and shock coolant)×(Catalyst Temp Inlet–Catalyst Temp outlet).

In one embodiment, the heat exchanger 214 includes a first conduit 202 and a housing 204. Material (i.e. catalyst) flows from the unit 201 via the conduit 202 and a coolant is circulated through the coolant volume 206 defined between the first conduit 202 and the housing 204 to extract heat from the material in the first conduit 202. In one embodiment, the first conduit 202 of the heat exchanger 214 is substantially non-tortuous and substantially free of bends or curves. It should be noted that some bends or curves may exist. In one embodiment, the first conduit 202 is substantially non-tortuous and free of bends or curves to an amount of less than about 10% by surface area. In another embodiment, the first conduit 202 is substantially non-tortuous and free of bends or curves to an amount of less than about 5% by surface area. In a particular embodiment, the first conduit 202 is substantially non-tortuous and free of bends or curves to an amount of less than about 1% by surface area. In one embodiment, the first conduit 202 of the heat exchanger is substantially linear. In a particular embodiment, first conduit 202 is substantially linear up to about 99%, up to about 95%, up to about 90%, up to about 85%, up to about 80%, and up to about 75%.

"Substantially free" of an element such as oxygen or 'substantially linear' expressly allows the presence of trace amounts on such elements and is not to be limited to a specified precise value, and may include values that differ from the specified value. In one embodiment, "substantially free" expressly allows the presence of trace amounts of non-linear surfaces. In a particular embodiment, "substantially free" expressly allows the presence of trace amounts of non-linear circumference, area, or volume, in respectively continuous or discrete fashion, such that the total circumference, area, or volume of a first conduit 202 is substantially non-tortuous and free of bends or curves by less than about 10%, by less than about 5%, by less than about 1%, by less than about 0.5%, and less than about 0.1%. "Substantially free" expressly allows the presence of the respective trace amounts of non-linear surfaces, etc. but does not require the presence non-linear surfaces, such as bends or curves.

Approximating language, as used herein throughout the specification and claims, may be applied to modify any quantitative or qualitative representation that could permissibly vary without resulting in a change in the basic function to which it is related. Accordingly, a value modified by a term such as "less than about" a given amount of oxygen or "substantially free of" is not to be limited to a specified precise value, and may include values that differ from the specified value. In at least some instances, the approximating language may correspond to the precision of an instrument for measuring the value. Furthermore, "withdrawal of material" may be used in combination with a term, and include a varying amount of withdrawn material and is not to be limited to a specified precise value, and may include values that differ from a specified value.

In one embodiment of the heat exchanger 214, the housing 204 includes a tube maintained at a spaced apart relation from the first conduit 202. The shape and size of the housing may vary and is adjustable based on intended use. The first conduit 202 includes one or more protrusions 210 to hold the first conduit in spaced apart relation relative to the housing. In one embodiment, the protrusion 210 is unattached to the housing 204 to allow the longitudinal expansion of the conduit 202 relative to the housing 204. In one embodiment, the heat exchanger 214 includes a first conduit 202 and a housing 204 wherein the housing 204 wraps around the first conduit 202 like a helix.

The shape and size of the protrusions 210 or housing 204 may vary. For illustration and not limitation, the protrusions 210 may be in the shape of a sphere, fiber, plate, cube, tripod, pyramid, rod, tetrapod, fins, studs, etc., either individually or in a combination thereof. In one embodiment, protrusions 210 include fins, studs or other geometric shape extending into the coolant volume 206 defined between the housing 204 and the first conduit 202 that increases the heat transfer area. Properties of each protrusions 210 are independent of any other protrusions 210. For example, the dimensions of each protrusion 210, including, for example, such dimensions as depth, width, length and shape, may independently vary from embodiment to embodiment and FIG. 2 depicts the protrusion 210 as studs or fins for illustration only. The size of the protrusions 210 also may vary and can depend on its heat exchanger and intended use.

In one embodiment, the heat exchanger 214 has an operational temperature range from about ambient to 1600° F. The sliding seal and the coupled protrusions 210 allow the first conduit 202 to expand longitudinally relative to the housing 204 over such operational temperatures. The heat exchanger 214 may further comprise a coolant fluid (i.e. cooling fluid) path 212 extending through the coolant volume. The coolant air path may be coupled to a blower 224, a source of plant air 216, or an eductor 218, either individually or in combination thereof. Non-limiting examples of coolant fluid include but is not limited to, air, low pressure water, high pressure water, nitrogen, and heat transfer fluids such as phenoxybenzene, phenylbenzene (also known by Dowtherm™) 1,1'-Biphenyl, chloro derivatives (also known by Santotherm™,) steam, etc, either individually or in a combination of two or more thereof. In one embodiment, coolant fluid includes coolant fluids which minimize boiling such as high pressure water In one embodiment, coolant flow rate may be measured by such as but not limited to turbine meter, positive displacement meter, orifice meter, pitot tube, Venturi meter, magnetic flow meter, mass flow meter etc., either individually or in a combination of two or more thereof. Although a coolant flow rate sensor is not shown in FIG. 2, the position of the sensor 286 is indicative of one position where a coolant flow rate sensor may be utilized.

In one non-limiting embodiment, a plurality of material inlets 232 are respectively coupled to a plurality of units 201. In another non-limiting embodiment, the plurality of material inlets 232 are respectively coupled to a plurality of units 201 in parallel. In a particular non-limiting embodiment, at least one of the material inlets 232 is selectively coupled to a plurality of units 201.

In another embodiment of a material withdrawal apparatus 200, a plurality of material inlets 232 are respectively coupled to an unit 201 in parallel. In another embodiment, a material inlet 232 is alternatively coupled to a plurality of units 201 by a diverter valve.

In an embodiment, the material withdrawal apparatus 200 are configured to withdraw material from one or more units 201 such as, but not limited to, an FCC unit, fixed bed or moving bed unit, bubbling bed unit, unit suitable for the manufacture of pyridine and its derivatives, unit suitable for the manufacture of acrylonitrile, unit operated at a low oxygen environment condition, low oxygen environment condition such as but not limited to partial burn partial combustion, mixed mode FCC, full combustion FCC with poor air circulation, etc., and other units suitable for industrial processes, etc., either individually or in a combination of two or more.

In a particular embodiment, the material withdrawal apparatus 200 may be configured to withdraw material from a plurality of units 201 that are FCC units. In such embodiment, the material withdrawal apparatus may have an operational pressure of about 0 to about 100 pounds per square inch. The FCC unit is adapted to promote catalytic cracking of petroleum feed stock provided from a source and may be configured in a conventional manner. One example of a material withdrawal apparatus that may be adapted to benefit from the invention is described in U.S. Pat. No. 7,431,894, filed Jul. 19, 2005, which is incorporated by reference in its entirety. Another example of a material withdrawal apparatus that may be adapted to benefit from the invention is described in U.S. patent application Ser. No. 61/026,343, filed Feb. 5, 2008, which is incorporated by reference in its entirety. Another example of a material withdrawal apparatus that may be adapted to benefit from the invention is described in U.S. patent application Ser. No. 61/094,650, filed Oct. 14, 2008, which is incorporated by reference in its entirety. In one embodiment, the material withdrawal apparatus 200 is configured to withdraw material from the plurality of units 201 through material inlet 232. In another embodiment, the material withdrawal apparatus 200 is configured to withdraw material from units designed to crack gasoline into Liquefied Petroleum Gas (LPG) such as but not limited to Superflex™ process or crack heavy feed into LPG instead of gasoline such as but not limited to Indmax™ process.

In another particular embodiment, the material withdrawal apparatus 200 may be configured to withdraw material from a unit 201 for processing acrylonitrile. The material withdrawal apparatus has at least one material inlet 232 adapted for coupling to the unit 201. An example of a unit 201 suitable for the manufacture of acrylonitrile is a fluidized bed process. Similar units are also used for manufacturing other chemicals such as pyridine.

The embodiments of the material withdrawal apparatus 200 are configured to withdraw various materials and embodiments of the invention are not limited by what material is being withdrawn or the form of the material being withdrawn. Examples of compositions of material include but are not limited to alumina, silica, zirconia, aluminosilicates, etc., either individually or in a combination of two or more compositions. Non-limiting examples of the form of material include liquid, powder, formed solid shapes such as microspheres, beads, and extrudates, either individually or in a combination of two or more forms. Non-limiting examples of materials may be referred as and include catalyst, product, powder, additive, equilibrium spent catalyst, and catalyst fines. Non-limiting examples of material withdrawal apparatus include a material addition vessel such as a pressurized vessel, a batching vessel for delivering as liquid, powders, and formed solid shapes such as microspheres, beads, and extrudes, either individually or in a combination of two or more.

Embodiments of the heat exchanger 214 include, but are not limited to, as described above. In one embodiment of the heat exchanger, a housing confines a coolant volume around at least a portion of the conduit; and a sliding seal 208 seals the housing to the conduit in a manner that allows the first conduit to expand longitudinally relative to the housing. Non-limiting embodiments of sliding seal are described in FIG. 3-5.

Figure 3:
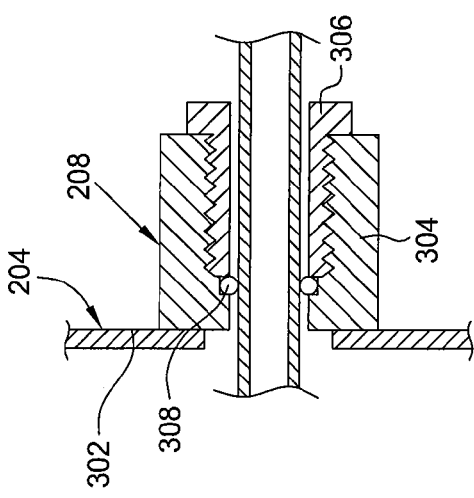
FIG. 3 is schematic diagram detailing a heat exchanger in accordance with an embodiment of the present invention.

FIG. 3. includes an embodiment of the sliding seal 208. The sliding seal 208 includes a seal housing 304, a retainer 306, and a seal 308. The seal housing 204 is coupled to an end cap 204.

Figure 4:
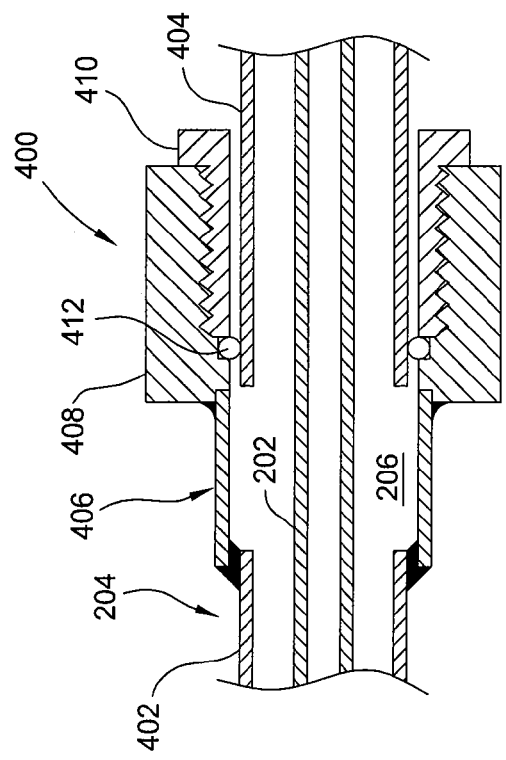
FIG. 4 is another schematic diagram of a heat exchanger with a seal in accordance with an embodiment of the present invention.

FIG. 4 includes another embodiment of a sliding seal 400. The sliding seal 400 couples a first portion 402 of the housing to a second portion 404 of the housing. The sliding seal 400 includes a sleeve 406, seal housing 408, a retainer 410, and a seal 412. The sleeve 406 is welded, brazed or otherwise fastened or connected in a substantially leak free manner to the first portion 402 of housing. The seal housing 408 is coupled to the sleeve. 406. The retainer 410 is threaded into the seal housing 408 to retain the seal against the first conduit 202.

Figure 5:
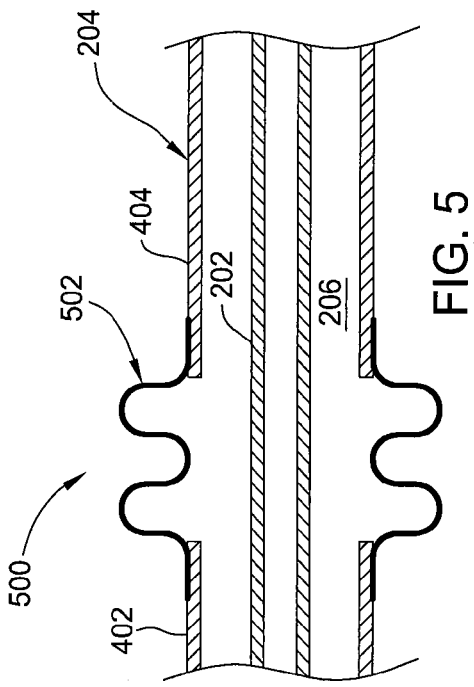
FIG. 5 is another schematic diagram of a heat exchanger with a seal in accordance with an embodiment of the present invention.

FIG. 5. includes another embodiment of a sliding seal 500. The sliding seal includes one or more bellows 502. The bellows 502 couples the first portion 402 of the housing to the second portion 404 of the housing.

The material withdrawal apparatus 200 may also include a gas source 216 coupled to the first conduit 202 of the heat exchanger 214. The air or other gas source 216 may be utilized to fluidize, aerate and/or otherwise cool the withdrawn material disposed in the vessel. The material withdrawal apparatus may also include a dynamic control valve 220 to control the amount of gas delivered from the gas source into the first conduit. In one embodiment, the flow of material through heat exchanger is maintained at a rate from about 5 ft/second to about 30 feet per second. In another embodiment, the flow of material through heat exchanger is at a rate from about 5 ft/second to about 15 feet per second. In a particular embodiment, the flow of material through heat exchanger is a rate of about 10 feet per second, with a tolerance of up to about +30%. In one embodiment, the flow of material through heat exchanger may have a standard deviation up to about +30%, up to about 20%, and up to about 10%.

Figure 6:
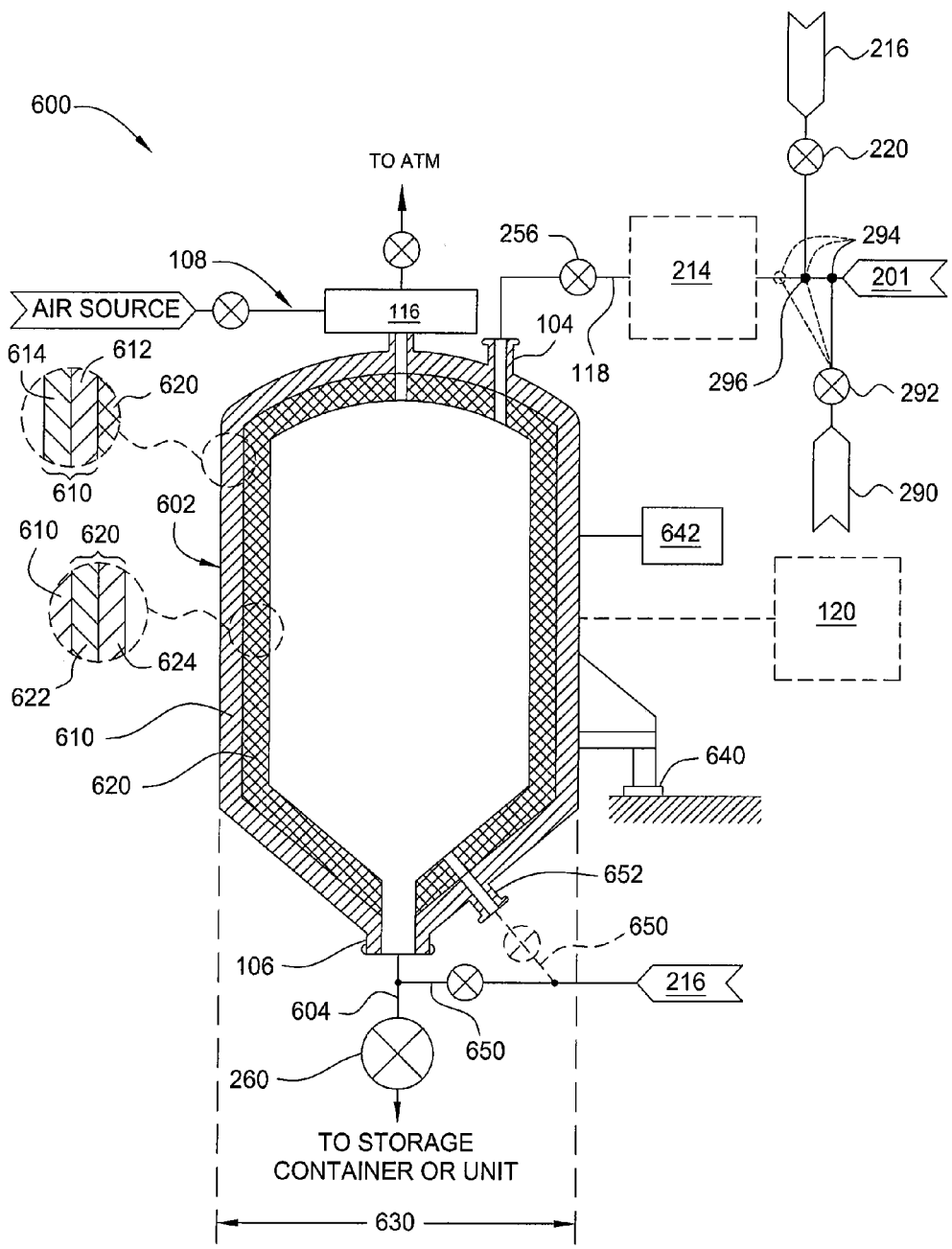
FIG. 6 is a schematic diagram of a material withdrawal apparatus with a delivery vessel and transport medium junction or shock coolant junction in accordance with an embodiment of the present invention.

In another embodiment, as depicted in FIG. 6, a material withdrawal apparatus 600 includes a vessel 602 and one or more transport medium junctions 296. A transport medium junction 296 is configured to provide one or more transport mediums to transport the material from one or more units to one or more vessels 602 and the invention is not limited by the location of the transport medium junction or combination of junctions. Another embodiment of the material withdrawal apparatus 200, as depicted in FIG. 6, includes a vessel 602 and one or more shock coolant junctions 294. The shock coolant junction 294 is configured to provide one or more shock coolant sources 290 to the withdrawn material from the at least one unit and the valve 292 may regulate the flow or amount of shock coolant source 290. Another embodiment of the material withdrawal apparatus includes one or more vessels 602, one or more shock coolant junctions 294 and one or more transport medium junctions 296.

In one embodiment, the material withdrawal apparatus 600 further includes a metering device 256 coupled to the fill port 104 to monitor or control the amount of material received from one or more units 201. The metering device 256 may be an on/off valve such as an everlasting valve, a rotary valve or other device suitable for removing and/or regulating the amount of material withdrawn from the unit 201 into the vessel 602. The metering device 256 may determine the amount of material by weight, volume, timed dispense or by other manners. The material requirements of a unit 201 may vary. In one embodiment wherein the unit 201 is an FCC unit, the metering device 256 is typically configured to remove about 0.1 to about 30 tons per day of catalyst from the regenerator 150 without interruption of processing in the FCC unit. The metering device 256 typically removes catalysts from the FCC unit 110 periodically over the course of a planned production cycle, typically 24 hours, in multiple shots of predetermined amounts spaced over the production cycle. However, catalysts may also be removed from the FCC unit 110 in an "as needed" basis as discussed above.

In the embodiment, metering device 256 is a control valve that regulates the amount of material delivered from an unit 201 into the storage vessel 602 by timed actuation. The control valve may include shear disk (not shown) for opening and closing a valve orifice. In one embodiment, the shear disk rotates eccentricity while additionally rotating clear of the orifice to provide a self-lapping, seat cleaning action that prevents the withdrawn catalyst from grooving the sealing surfaces of the shear disk and valve seat that could cause the valve leakage. One valve that may be adapted to benefit from the invention is available from the Everlasting Valve Company, located in South Plainfield, N.J. Other control valves may alternatively be utilized.

An outlet valve 260 is coupled to the discharged port 106 to control the amount of withdrawn catalyst removed from the vessel 602 to the spent catalyst storage/disposal (not shown) through an outlet line 604.

In one embodiment, the control valve of the metering device 256 and the outlet valve 260 are interlocked to prevent simultaneous opening. This allows data to be obtained between valve openings such that the amount of catalyst entering and leaving the vessel 602 may be accurately resolved. In one embodiment, the outlet valve 260 is opened while the flow control circuit 108 provides air at about 60 psi (about 4.2 kg/cm$^2$) into the interior of the vessel 602 to cause catalyst to flow from the vessel 602 through the valve 260 and into the spent catalyst storage/disposal via the outlet port 106. Embodiments of the invention also include the outlet valve 260 being opened while the pressure regulating system 642 provides other gas such as nitrogen or inert gas, either individually or in a combination thereof.

In one embodiment, the material withdrawal apparatus 600 further includes one or more heat exchangers 214, and one or more delivery lines 118. The delivery line 118 is coupled to the inlet 104 for delivering withdrawn material from one or more units 201 to the vessel 602.

In one embodiment, the heat insulating refractory material of the liner 620 includes one or more materials such as but not limited to oxides of aluminum (alumina), silicon (silica), magnesium (magnesia), calcium (lime), Zirconia, either individually or in a combination of two or more thereof. In one embodiment, the insulating refractory material comprises a coating or thickness from about 1 to about 6 inches. In another embodiment, the insulating refractory material comprises a coating thickness from about 2 to about 4 inches. In yet another embodiment, the insulating refractory material comprises a thickness from about 3 to about 4 inches.

In one embodiment, the liner 620 may comprise a thickness based on one type of coating in one embodiment. In other embodiments, the liner 620 may comprise a thickness based on two or more different types of coatings, such as a first coating 622 and a second coating 624. Thus, the liner 620 may comprise multilayer coatings wherein the first and the second coating are the same or differ from each other.

Embodiments of the invention are not limited by what the heat insulating refractory material is, and is also not limited by the amount, thickness, or form of the heat insulating refractory material. What the heat insulating refractory material is and the amount, thickness, or form of the heat insulating refractory material may readily be adjusted according to the conditions and application of the vessel 602. For example, in one embodiment, heat insulating refractory material includes capability of withstanding extremely high temperatures such as such as but not limited to oxides of aluminum (alumina), silicon (silica), magnesium (magnesia), calcium (lime), Zirconia, either individually or in a combination of two or more thereof.

In one embodiment, the wall 610 includes one or more materials such as but not limited to carbon steel. The wall 610 may be a carbon steel in the form of a jacket around the vessel. In one embodiment, the wall 610 has a metallic surface. The wall 610 may include one or more metals, such as but not limited to, Au, Ag, Cu, Ni, Pd, Pt, Al, and Cr, either individually or through any combination thereof. In another embodiment, the wall 610 may include iron, nickel, cobalt, manganese, tin, vanadium, nickel, titanium, chromium, manganese, cobalt, germanium, bismuth, molybdenum, antimony, and vanadium, either individually or in a combination of two or more thereof.

In one embodiment, the wall 610 comprises a coating or thickness from about 1 to about 2 inches. In another embodiment, the wall 610 comprises a coating or thickness from about ⅜ to about 2 inches. In yet another embodiment, the wall 610 comprises a thickness from about ⅜ to about ⅝ inches. In one embodiment, the wall 610 may comprise a thickness based on one type of coating in one embodiment. In other embodiments, the wall 610 may comprise a thickness based on two or more different types of coatings, such as a first coating 612 and a second coating 614. Thus, the wall 610 may comprise multilayer coatings wherein the first and the second coating are the same or differ from each other.

Embodiments of the invention are not limited by what the wall 610 is and is also not limited by the amount, thickness, or form of the wall. What the wall 610 is and the amount, thickness, or form of the wall 610 may readily be adjusted according to the conditions and application of the vessel 602. For example, in one embodiment, the wall 610 is capable of withstanding extremely high temperatures and the wall 610 thicknesses may be varied based on vessel diameter 630 and design pressures of the vessel 602 As shown in table:

| Diameter | 50 psig (pounds per square inch gage) Elliptical Head | 50 psig Shell | 125 psig Elliptical Head | 125 psig Shell |
| --- | --- | --- | --- | --- |
| 3'-0" | ⅜" | ⅜" | ⅜" | ⅜" |
| 6'-0" | ½" | ½" | ½" | ½" |
| 10'-0" | ⅝" | ⅝" | ⅝" | ⅝" |

The liner 620 may comprise a thickness based on one type of coating in one embodiment. In other embodiments, liner 620 may comprise a thickness based on two or more different types of coatings, such as a first coating 622 and a second coating 624. Thus, the liner 620 may comprise multilayer coatings wherein the first and the second coating are the same or differ from each other.

In one embodiment, the material withdrawal apparatus 600 further includes a control valve 220 configured to control the amount of gas to the delivery line 118 and entrained with the material. In a particular embodiment, the material withdrawal apparatus 600 optionally includes one or more heat exchanger 214 and or one or more flow control circuits 108 coupled to the vessel.

In one embodiment, material withdrawal apparatus 600 further includes a flow control circuit 108 is configured to dynamically regulate backpressure within the vessel 602 to control the flow of material into the vessel 602 from the unit 201. An advantage of this positioning of the flow control circuit 108 downstream of the vessel 602 may include, but is not restricted to, keeping the components of the flow circuit 108 isolated from the abrasive materials (e.g., catalyst) which exposure thereto would degrade their performance and require more costly flow circuit components.

In one embodiment, the vessel 602 is suitable for high temperature operation. In a particular embodiment, the vessel 602 is suitable for receiving catalyst at a temperature in excess of about 600° C. In another embodiment, the vessel 602 is suitable for receiving material at a temperature in a range from about 600° C. to about 850° C. In yet another embodiment, the vessel 602 is suitable for receiving material at a temperature in excess of about 800° C. In yet another embodiment, the vessel 602 is suitable for receiving material at a temperature in a range from about 600° C. to about 850° C. In yet another embodiment, the vessel 602 is suitable for receiving material at a temperature in excess of about 800° C. In yet another embodiment, the vessel 602 comprises a pressure vessel. For example, the pressure vessel is pressurizable from about 5 to about 60 pounds per square inch (about 0.35 to about 4.2 kg/cm$^2$) during withdrawal operations. Intermittently, the vessel 602 may be vented to about atmospheric pressure.

In one embodiment, the unit 201 comprises one or more fluid catalyst cracking units (FCCU). It should be appreciated that the material withdrawal apparatus 600 and method may apply to other fluidized bed systems as well, such as but not limited to, fluidized bed combustors in the power industry and fluidized bed system with lower temperature applications. It should be appreciated that the material withdrawal apparatus 600 may remove material from one or more of such units 201, simultaneously or sequentially. In one embodiment, the material withdrawal apparatus 600 may remove material from a plurality of units 201, wherein the units may be the same or differ from each other.

In one embodiment, the material withdrawal apparatus further include one or more to filters 116 disposed between the vessel 602 and flow control circuit 108. An advantage may be the filter prevents abrasive materials such as catalyst from reaching the flow control circuit. The filter 116 may have a filtration element that is a sintered metal or a woven metal mesh. In one embodiment, the filtration element of the filter has a metallic surface. The filtration element of the filter 116 may include one or more metals, such as but not limited to, Au, Ag, Cu, Ni, Pd, Pt, Al, and Cr, either individually or through any combination thereof. In another embodiment, the filtration element of the filter 116 may include titanium, austenitic nickel-based superalloys such as Inconel™, ceramic, iron, nickel, cobalt, manganese, tin, vanadium, nickel, titanium, chromium, manganese, cobalt, germanium, bismuth, molybdenum, antimony, and vanadium, either individually or in a combination of two or more thereof. In one embodiment, benefits of using a filter may include but is not limited to keeping or minimizing potentially toxic dust out of the atmosphere.

In a particular embodiment, the filter 116 comprises a stainless steel filtration element. In a particular embodiment, the filter comprises a woven stainless steel mesh filtration element. It should be appreciated that the filtration element of the filter 116 may include any other inorganic or organic material provided that the filtration element includes a sufficient amount of metal to provide heat resistance. In one embodiment, the filtration element of the filter 116 comprises a sufficient amount of metal to withstand heat from the withdrawn catalyst. In one embodiment, the filter 116 is suitable for receiving catalyst at a temperature in excess of about 600° C. In yet another embodiment, the filter 116 is suitable for receiving catalyst at a temperature in a range from about 600° C. to about 850° C. In yet another embodiment, the filter 116 is suitable for receiving catalyst at a temperature in excess of about 800° C. In another embodiment, the filter 116 has an operational temperature at a range from about ambient to 760° C.

The shape and size of the filter 116 may vary. For example, the filter 116 may be in the shape of a sphere, fiber, plate, cube, tripod, pyramid, rod, tetrapod, pleated or any non-spherical object. In one embodiment, the filter 116 is substantially cylindrical.

The size of the filter 116 also may vary and can depend on its composition and intended use. In one embodiment, air flow may be reversed to clean the filter 116 such that a substantial amount of trapped particulate in the filter is returned to the vessel 602 by the reversed air flow.

In one embodiment, the material withdrawal apparatus 600 includes one or more sensors coupled to the vessel and configured to provide a metric indicative of material entering the vessel through a metering device. Non-limiting examples of sensors, for illustration and not limitation, include a load cell, a differential pressure sensor, flow sensor, and a level sensor, either individually or in a combination thereof. The material withdrawal apparatus may be equipped with one or more sensors that provide a metric indicative of a material level within a unit, such as the regenerator of an FCCU. In one embodiment, the unit includes a first sensor and a second sensor configured to detect when the level of material within the regenerator exceeds an upper or lower threshold. The sensor may be a differential pressure measurement device, optical transducer, a capacitance device, a sonic transducer or other device suitable for providing information from which the level or volume of material disposed in the regenerator may be resolved. For example, if the first sensor provides an indication to a controller that the material level is low, the controller may initiate material injection by the material injection system. Conversely, if the second sensor provides an indication to the controller that the material level is high, the controller may initiate a material withdrawal from the unit 201 by the material withdrawal apparatus 600, or speed up these otherwise semi-continuous withdrawal processes.

In one embodiment, the material withdrawal apparatus 600 includes one or more sensors 640 for providing a metric suitable for resolving the amount of material passing through a metering device during each withdrawal of material from unit 201, such as an FCCU unit. The sensor or plurality of sensors may be configured to detect the level (i.e., volume) of material, the weight of material, and/or the rate of material movement through at least one of the vessel, in let, outlet, regenerator, or the metering device. Non-limiting examples of sensors include load cell, a differential pressure sensor, flow sensor, and a level sensor, either individually or in a combination thereof.

In the embodiment, the sensor 640 includes a plurality of load cells adapted to provide a metric indicative of the weight of material in a vessel 602. The load cells are respectively coupled to a plurality of legs that supports the vessel above a surface such as a concrete pad. Each of the legs has one load cell coupled thereto. The controller receives the outputs of the load cell and utilizes sequential data samples obtained therefrom to resolve the net amount of withdrawn material after each actuation of the metering device. Data samples are also taken after actuation of the outlet valve such that the true amount of material withdrawn from the unit 201 via the material withdrawal apparatus 600 may be accurately determined. Additionally, the net amount of material withdrawn over the course of the production cycle may be monitored so that variations in the amount of material dispensed in each individual shot may be compensated for by adjusting the withdrawal attributes of the metering device, for example, changing the open time of the flow control circuit 108 to allow more (or less) material to pass therethrough and be removed from the unit 201.

Alternatively, the sensor 640 may be a level sensor coupled to the vessel and adapted to detect a metric indicative of the level of material within the vessel 602. The level sensor may be a differential pressure measuring device, an optical transducer, a capacitance device, a sonic transducer or other device suitable for providing information from which the level or volume of material disposed in the vessel my be resolved. By utilizing the sensed difference in the level of material disposed in the vessel after dispenses, the amount of material removed from the regenerator may be resolved for a known vessel geometry.

Alternatively, the sensor 640 may be a flow sensor adapted to detect the flow of material through one of the components of the material withdrawal apparatus 600. The flow sensor maybe a contact or non-contact device and may be mounted to the vessel, the metering device or the conduit coupling the vessel to a waste container. In the embodiment, the flow sensor may be a sonic flow meter or capacitance device adapted to detect the rate of entrained particles (i.e., catalyst) moving through the delivery line.

Another embodiment of the material withdrawal apparatus includes one or more heat exchangers 214 coupled to the vessel 602. In a particular embodiment, the material withdrawal apparatus 600 optionally includes one or more control valves 220 and one or more flow control circuits 108 coupled to the vessel 602.

Figure 7:
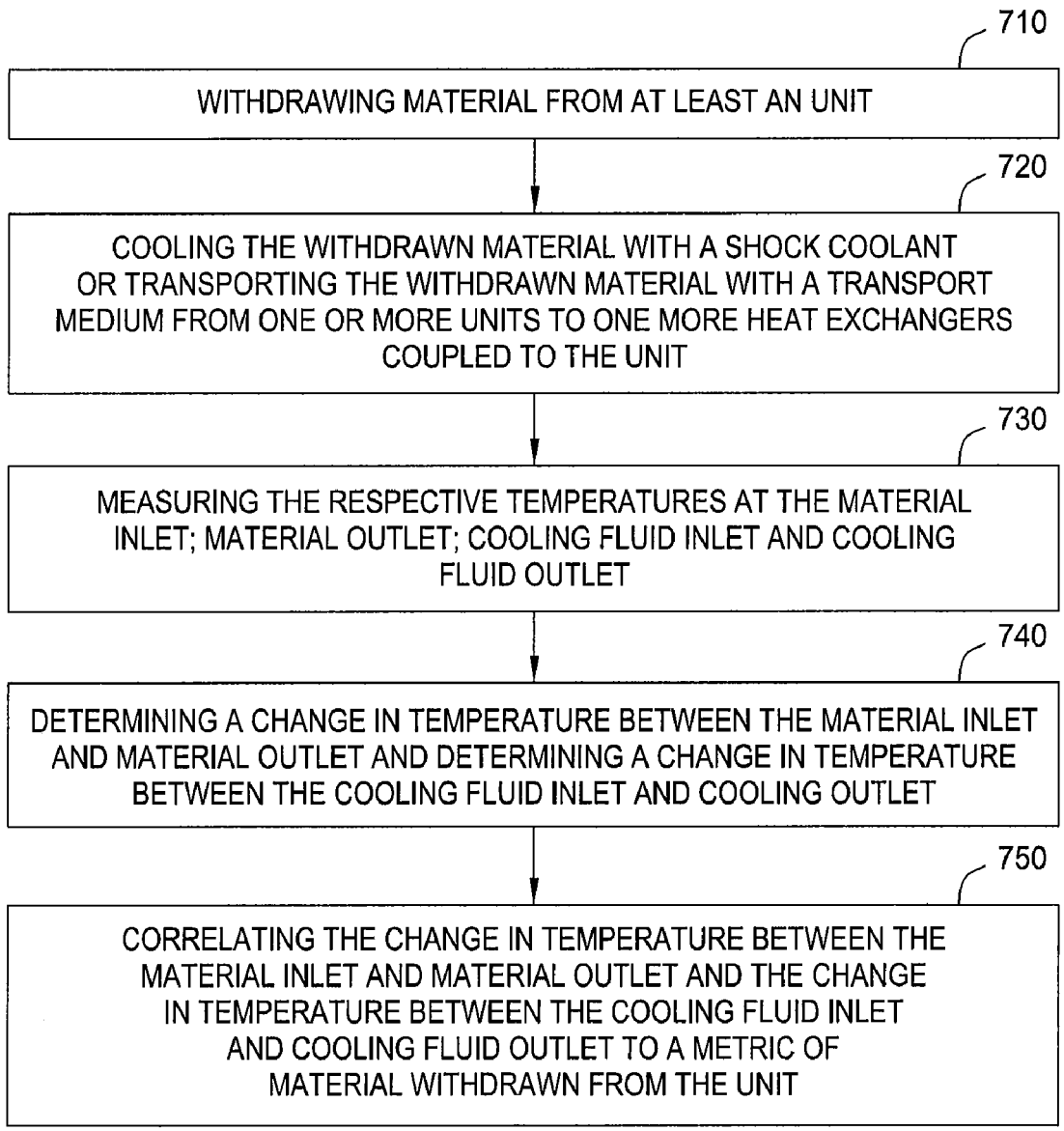
FIG. 7 is a flow diagram of a method of regulating material in an unit in accordance with an embodiment of the present invention.

With reference to FIG. 7, next is depicted a method of withdrawing one or more materials from one or more units 201. The method includes a step 710 of withdrawing material from one or more units. Step 720 includes cooling the withdrawn material with a shock coolant and or transporting the withdrawn material with a transport medium from one or more units to one or more heat exchangers coupled to the unit.

An embodiment comprises providing transport medium and shock cooling the withdrawn material from the unit 201. The described methods are not limited by the sequence of when and how providing transport medium and shock cooling occur. One embodiment comprises sequentially providing transport medium and shock cooling the withdrawn material from at least one unit. Another embodiment comprises simultaneously providing transport medium and shock cooling the withdrawn material from at least one unit. One embodiment comprises operating an unit 201 at low oxygen environment condition. The method is also not limited by the frequency of providing transport medium and shock cooling.

Optionally, the method may also include a step 730 of measuring the respective temperatures at the material inlet; material outlet; cooling fluid inlet and cooling fluid outlet, along with the flow of the coolant stream. The step 720 of measuring the temperature may be performed by a temperature sensor such as but not limited to thermocouples, Pt Resistance Thermometers, and IR cameras.

Optionally, the method may further include Step 740 determining a change in temperature between the material inlet and material outlet and determining a change in temperature between the cooling fluid inlet and cooling fluid outlet Optionally, the method may further include Step 750 correlating the change in temperature between the material inlet and material outlet and the change in temperature between the cooling fluid inlet and cooling fluid outlet, and the flow of the coolant fluid to a metric of material withdrawn from the unit 201. Thus, Step 750 includes determining a metric of the amount of material within the unit. In an embodiment, the method further includes a vessel coupled downstream to the material outlet of the heat exchanger. In a particular embodiment, the vessel comprises heat insulating refractory material as described above.

Figure 8:
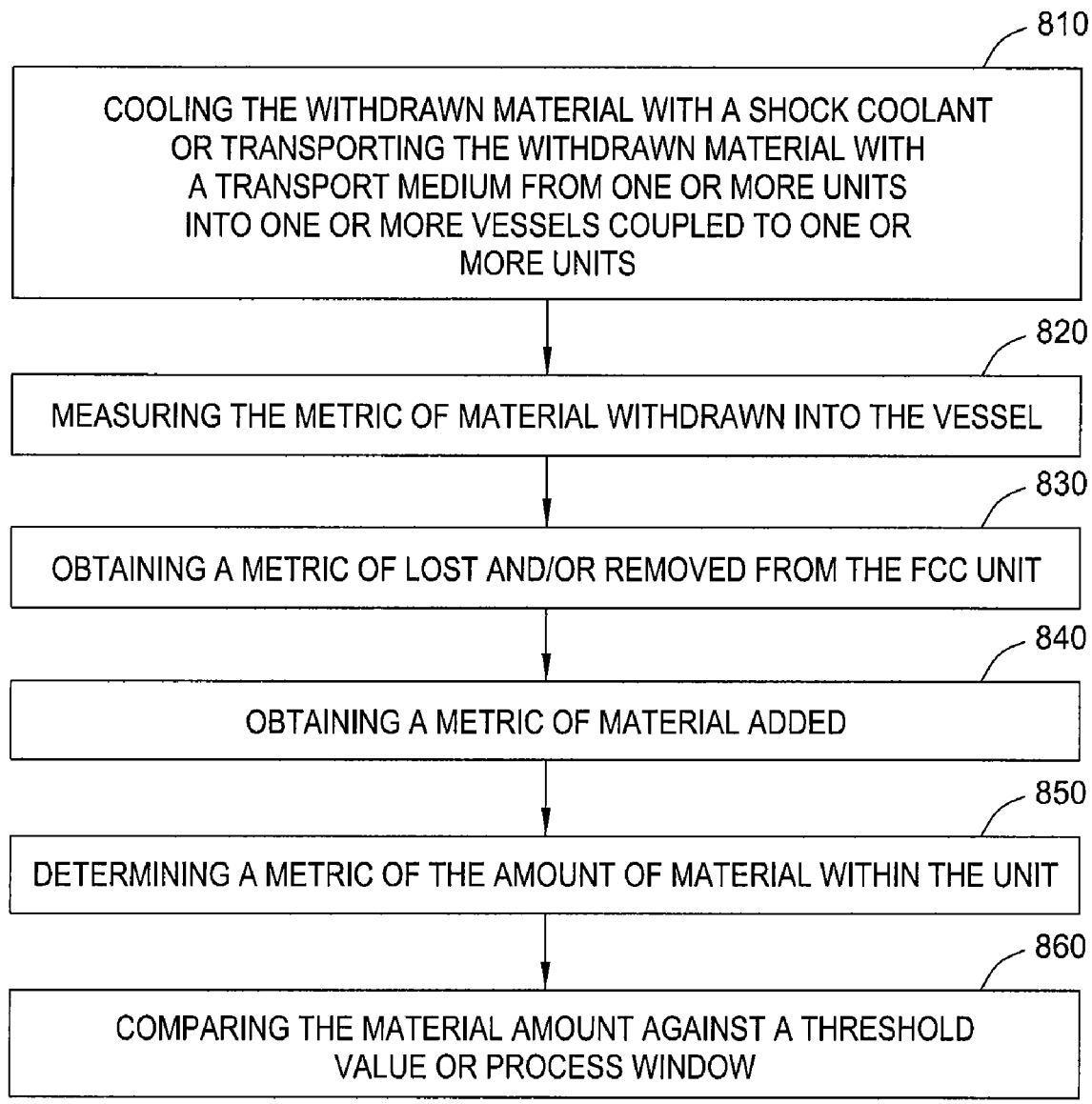
FIG. 8 is a flow diagram of another method of regulating material in an unit in accordance with an embodiment of the present invention.

With reference to FIG. 8, next is depicted another method of withdrawing one or more materials from one or more units 201. The method includes a step 810 cooling the withdrawn material with a shock coolant and or transporting the withdrawn material with a transport medium from one or more units into one or more vessels coupled to the one or more units. The described methods are not limited by the frequency or sequence of when and how providing transport medium and shock cooling occur. An embodiment comprises providing transport medium and shock cooling the withdrawn material from the unit. One embodiment comprises sequentially providing transport medium and shock cooling the withdrawn material from at least one unit. Another embodiment comprises simultaneously providing transport medium and shock cooling the withdrawn material from at least one unit. In an embodiment, at least one unit is operated at low oxygen environment condition.

In one embodiment, the vessel 602 includes a wall 610, liner 620, fill port 104 and a discharge port 106. The liner comprises a heat insulating refractory material and the fill port is configured to receive withdrawn material from at least a unit.

Optionally, the method may also include Step 820 measuring the metric of material withdrawn into the vessel. Step 820 of measuring the metric of material withdrawn into the vessel may be performed by a metering device 256. In the embodiment, one or more sensors 640 are coupled to the vessel 602 and configured to provide the metric indicative of material entering the vessel 602 via a metering device. Non-limiting examples of sensors, for illustration and not limitation, include a load cell, a differential pressure sensor, flow sensor, and a level sensor, either individually or in a combination of two or more thereof.

Optionally, in an embodiment, the step 820 of metering may be executed by a step 822 of obtaining a metric of material lost and/or removed from the unit. The metric of material lost may be a predefined value. For example, based on empirical data, or calculated data, or maybe a provided real time and/or as an updated metric. Examples of updated and/or provided metrics include a metric of material entrained in the product stream, material exiting the regenerator through the exhaust system, material removed from the metered withdrawal system, among others.

At step 824, a metric of material added is obtained. The metric of material addition are typically attained from the material addition system, in the form of catalyst and/or additives added to the unit.

At step 826, a metric of the amount of material within the unit is determined. In one embodiment, the amount of material is determined by summing the material additions of 824 minus the material removed from the system obtained at step 822. The determination of material within the unit may be made from data obtained over a predetermined period of time. The predetermined period of time may be in fractions of an hour, hourly, daily or over other time periods. The determination of material within the unit 201 may be made from data obtained real time, for example, by monitoring a data stream such as regenerator bed level. As the process described above is iterative, the total material determined may, alternatively, be calculated by subtracting the material removed over the period from the last determination and adding the material added over the same period.

Optionally, at step 828, the material amount is compared against a threshold value or process window. If the determined material is outside of a predefined process window (or exceeds the threshold), appropriate material additions or withdrawals are made at step 810. This cycle of monitoring the amount of material is repeated in order to maintain the dynamic material equilibrium in the unit. Advantageously, this allows the unit to continue operating at or near processing limits with minimal fluctuation, thereby providing the desired product mix and emissions composition with minimal disoptimisation, thereby maximizing the profitability of the FCC system refiner.

Optionally, a controller 120 is provided to control the function of at least the material withdrawal apparatus. The controller 120 generally includes a processor, support circuits and memory. The controller 120 may be any suitable logic device for controlling the operation of the material withdrawal apparatus 600. In one embodiment, the controller 120 is a programmable logic controller (PLC), such as those available from GE Fanuc. However, from the disclosure herein, those skilled in the art will realize that other controllers such as microcontrollers, microprocessors, programmable gate arrays, and application specific integrated circuits (ASICs) may be used to perform the controlling functions of the controller 120.

The controller 120 is coupled to various support circuits that provide various signals to the controller 120. These support circuits include, power supplies, clocks, input and output interface circuits and the like. Other support circuits couple to the flow control circuit 108, the control valve 220, and the like, to the controller 120. In one embodiment, the controller 120 controls the actuation of the control valve 220 such that the flow through the delivery line 118 and/or first conduit 202 of the heat exchanger 214 is maintained a rate that provides good heat transfer and substantially prevents the material from settling out of the flow with in the line 118 and/or conduit 202, while minimizing the abrasive, sandblasting effect, of the entrained material, such as the rates described above. In another embodiment, the controller 120 controls the actuation of one or more valves comprising the fluid control circuit 108 such that backpressure with in the vessel 602 may be regulated in a manner that controls the flow of material within the delivery line 118 from the unit 201 and into the vessel 602.

In another embodiment of a method for regulating material within a unit, the material withdrawal apparatus may be set to remove a predefined amount of material over a predefined period of time. For example, the material withdrawal apparatus 200 may be set to remove a target withdrawal of about 4 tons of material per day. The withdrawal may be made in predetermined increments, such that a total withdrawal amount will be made over the predefined period. In one embodiment the operator may manually initiate withdrawals from the regenerator using the system. For example, the operator may initiate a withdrawal in response to the material bed level within the regenerator, such as provided by information obtained by the sensor. The manual withdrawal may be made in addition to the target withdrawal, or count against the target withdrawal for that time period.

An embodiment further comprises withdrawing material from a unit to a heat exchanger, wherein a material outlet of the heat exchanger is coupled to the vessel. In a particular embodiment, the method further includes heat exchanging with one or more heat exchangers 214 as described above. In another embodiment, the methods further includes withdrawing material from a unit by heat exchanging with one or more heat exchangers 214, regulating back pressure with one or more flow control circuits 108, and regulating amount of gas flow with one or more control valves 220 configured to control the amount of gas to the delivery line 118 and entrained with the material, individually or in a combination of two or more thereof. In one embodiment, the method includes dynamically regulating backpressure within the vessel with one or more flow control circuits 108. In one embodiment, the method includes regulating amount of gas flow with a control valve 220 configured to control the amount of gas to the delivery line and entrained with the material. In one embodiment, the method includes withdrawing the material from the vessel and or recycling or re-adding the withdrawn material to the unit.

The described methods are not limited by a sequence of when and how heat exchanging with a heat exchanger, regulating back pressure with a flow control circuit, withdrawing to a vessel, regulating amount of gas with a control valve occur. Heat exchanging with a heat exchanger, regulating back pressure with a flow control circuit, and regulating amount of gas with a control valve may occur either sequentially or simultaneously. In one embodiment, heat exchanging with a heat exchanger occurs before, during or after optionally regulating back pressure with a flow control circuit, and regulating amount of gas with a control valve. In another embodiment, regulating back pressure with a flow control circuit occurs before, during or after optionally heat exchanging with a heat exchanger and regulating amount of gas with a control valve. In another embodiment, regulating amount of gas with a control valve occurs before, during or after optionally heat exchanging with a heat exchanger or regulating back pressure with a flow control circuit.

The method is also not limited by the frequency of heat exchanging with a heat exchanger, regulating back pressure with a flow control circuit, and regulating amount of gas with a control valve. The method is also not limited by the form of the heat exchanger, flow control circuit, control valve. Examples of the form of heat exchanger, flow control circuit, control valve include, but are not limited to, are described above.

The following examples are for illustration and not limitation.

When the weight measuring pressure vessel is bypassed, the mass of the catalyst cooled and transferred to the spent catalyst hopper will be calculated by a heat balance around the heat exchanger system by the use of the following equation:

Mass of air×Specific Heat of Air×(Air Temp outlet–Air Temp inlet)=(Mass of Catalyst, transport medium and shock coolant)×(Specific heat of catalyst, transport medium and shock coolant)×(Catalyst Temp Inlet–Catalyst Temp outlet)

Mass of Catalyst, transport medium, and shock coolant=(Mass of air×Specific Heat of Air×(Air Temp outlet–Air Temp inlet))/(Specific heat of catalyst, transport medium and shock coolant×(Catalyst Temp Inlet–Catalyst Temp outlet))

Example 1

Mass of Catalyst lb/min=(258.2 lbs air per min.×0.24 Btu/lbF×(266.3 F–100 F))/(0.27 Btu/lbF×(1350 F–800 F)=69.4 lb catalyst per min.

Example 2

Shock Coolant Comprise Water

| Hot catalyst Stream | | |
|---|---|---|
| Flow = | 4.23 | klb/hr |
| Cp = | 0.265 | btu/lb · deg F. |
| Temp = | 1345 | deg F. |
| Flow = | 1919.238 | kg/hr |
| Temp = | 729.4444 | Deg C. |
| Desired Temp = | 426.6667 | Deg C. |

-continued

| Hot catalyst Stream | | |
|---|---|---|
| Catalyst Delta T = | 302.7778 | Deg C. |
| Cp = | 1.109502 | KJ/Kg · K |
| Heat Removed = | 644734.4 | KJ/hr |
| Water Cp = | 4.1868 | KJ/Kg · K |
| Water latent heat = | 2260 | KJ/Kg |
| Water temp = | 25 | Deg C. |
| Water Delta T = | 775 | Deg C. |
| Sensible heat to water = | 3244.77 | KJ/Kg |
| Combined Sensible & Latent Heat to water = | 5504.77 | KJ/Kg |
| Flow of water required = | 117.1229 | kg/hr |

Example 3

Shock Coolant Comprise Liquid Nitrogen

| Hot catalyst Stream | | |
|---|---|---|
| Flow = | 4.23 | klb/hr btu/lb · deg |
| Cp = | 0.265 | F. |
| Temp = | 1345 | deg F. |
| Flow = | 1919.238 | kg/hr |
| Temp = | 729.4444 | Deg C. |
| Desired Temp = | 426.6667 | Deg C. |
| Catalyst Delta T = | 302.7778 | Deg C. |
| Cp = | 1.109502 | KJ/Kg · K |
| Heat Removed = | 644734.4 | KJ/hr |
| N2 Cp = | 1.04 | KJ/Kg · K |
| N2 latent heat = | 199.1 | KJ/Kg |
| N2 temp = | −196 | Deg C. |
| N2 Delta T = | 996 | Deg C. |
| Sensible heat to N2 = | 1035.84 | KJ/Kg |
| Combined Sensible & Latent Heat to N2 = | 1234.94 | KJ/Kg |
| Flow of N2 required = | 522.0775 | kg/hr |

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The embodiments described herein are examples of compositions, structures, systems and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, the invention is not limited to such disclosed aspects. Rather, the invention can be modified to incorporate any number of variations, alterations, substitutions or equivalent arrangements not heretofore described which are commensurate and within the scope of the claims. Many modifications and changes may occur to one of ordinary skill in the relevant art. The appended claims cover all such modifications and changes. It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A material withdrawal apparatus comprising:
a heat exchanger comprising:
material inlet coupled to at least an unit from which material is withdrawn;
at least a member selected from the group consisting of: transport medium junction configured to provide transport medium to transport the withdrawn material from the at least one unit to the heat exchanger, wherein the transport medium comprises at least one member selected from a group consisting of water, inert gas, transporting medium having an oxygen content less than the amount necessary to support combustion upon contact of transport medium with the withdrawn material, and combinations thereof; and shock coolant junction configured to provide shock coolant to withdrawn material from the at least one unit, wherein the shock coolant cools the withdrawn material to less than 427° C. and the shock coolant comprises at least one member selected from a group consisting of water, inert gas, liquid nitrogen, and combinations thereof.

2. The material withdrawal apparatus of claim 1, comprising a shock coolant junction and a transport medium junction.

3. The material withdrawal apparatus of claim 1, wherein the at least one unit is operated at a low oxygen environment condition.

4. The material withdrawal apparatus of claim 3, wherein the low oxygen environment condition is selected from a group consisting partial combustion, poor air circulation, CO rich environment condition, mixed mode FCC, and a combination of two or more.

5. A material withdrawal apparatus comprising:
a vessel comprising:
a wall;
a liner comprising a heat insulating refractory material;
a fill port and a discharge port defined in the vessel;
wherein the fill port is configured to receive withdrawn material from
at least an unit; and
at least a member selected from the group consisting of: transport medium junction configured to provide transport medium to transport the withdrawn material from the at least one unit to the vessel, wherein the transport medium comprises at least one member selected from a group consisting of water, inert gas, transporting medium having an oxygen content less than the amount necessary to support combustion upon contact of transport medium with the withdrawn material, and combinations thereof; and shock coolant junction configured to provide shock coolant to the withdrawn material from the at least one unit, wherein the shock coolant cools the withdrawn material to less than 427° C. and the shock coolant comprises at least one member selected from a group consisting of water, inert gas, liquid nitrogen, and combinations thereof.

6. The material withdrawal apparatus of claim 5, wherein at least an unit is operated at a low oxygen environment condition.

7. The material withdrawal apparatus of claim 6, wherein the low oxygen environment condition is selected from a group consisting partial combustion, poor air circulation, CO rich environment condition, mixed mode FCC, and combination of two or more.

8. The material withdrawal apparatus of claim 5, comprising shock coolant junction and transport medium junction.

9. The material withdrawal apparatus of claim 5, further comprising a metal filter coupled to a vent port of the vessel.

10. A method comprising:
withdrawing material from at least an unit; and
conducting at least a member selected from the group consisting of shock cooling the withdrawn material with a shock coolant and transporting the withdrawn material with a transport medium from the at least one unit to a heat exchanger coupled to the at least one unit, wherein the shock coolant cools the withdrawn material to less than 427° C. and the shock coolant comprises at least one member selected from a group consisting of water, inert gas, liquid nitrogen, and combinations thereof and the transport medium comprises at east one member selected from a group consisting of water, inert gas, transporting medium having an oxygen content less than the amount necessary to support combustion upon contact of transport medium with the withdrawn material, and combinations thereof.

11. The method of claim 10, further comprising operating the at least one unit at low oxygen environment condition.

12. A method comprising:
withdrawing material from at least an unit;
conducting at least a member selected from the group consisting of shock cooling the withdrawn material with a shock coolant, wherein the shock coolant cools the withdrawn material to less than 427° C., and transporting the withdrawn material with a transport medium from the at least an unit into a vessel coupled to the at least an unit wherein the transport medium comprises at least one member selected from a group consisting of water, inert gas, transporting medium having an oxygen content less than the amount necessary to support combustion upon contact of transport medium with the withdrawn material and combinations thereof and the shock coolant comprises at least one member selected from a group consisting of water, inert gas, liquid nitrogen, and combinations thereof, and
wherein the vessel comprises:
a wall;
liner comprising a heat insulating refractory material;
a fill port and a discharge port defined in the vessel; and
wherein the fill port is configured to receive withdrawn material from at least a unit.

13. The method of claim 12, further comprising operating the at least one unit at low oxygen environment condition.

14. A system comprising:
an unit coupled to a material withdrawal apparatus, wherein the material withdrawal apparatus comprises:
at least a member selected from a group consisting of:
(a) a heat exchanger comprising:
a material inlet coupled to the unit;
a material outlet;
a cooling fluid inlet;
a cooling fluid outlet;
a sensor coupled to the heat exchanger to provide a metric indicative of the temperature at the material inlet; material outlet; cooling fluid inlet and cooling fluid outlet; and (b) a vessel comprising a wall and a liner comprising heat insulating refractory material;
a fill port and a discharge port defined in the vessel;
wherein the fill port is configured to receive withdrawn material from at least a unit; and
at least a member selected from the group consisting of:
a transport medium junction configured to provide transport medium to transport the withdrawn material from the at least one unit to the heat exchanger, wherein the transport medium comprises at least one member selected from a group consisting of water, inert gas, transporting medium having an oxygen content less than the amount necessary to support combustion upon contact of transport medium with the withdrawn material, and combinations thereof; and
a shock coolant junction configured to provide shock coolant to withdrawn material from the at least one unit, wherein the shock coolant cools the withdrawn material to less than 427° C. and the shock coolant comprises at least one member selected from a group consisting of water, inert gas, liquid nitrogen, and combinations thereof.

* * * * *